April 6, 1926. 1,579,381
T. S. MILLER
LUBRICATING SYSTEM FOR THRUST MECHANISMS
Filed July 7, 1922 3 Sheets-Sheet 2

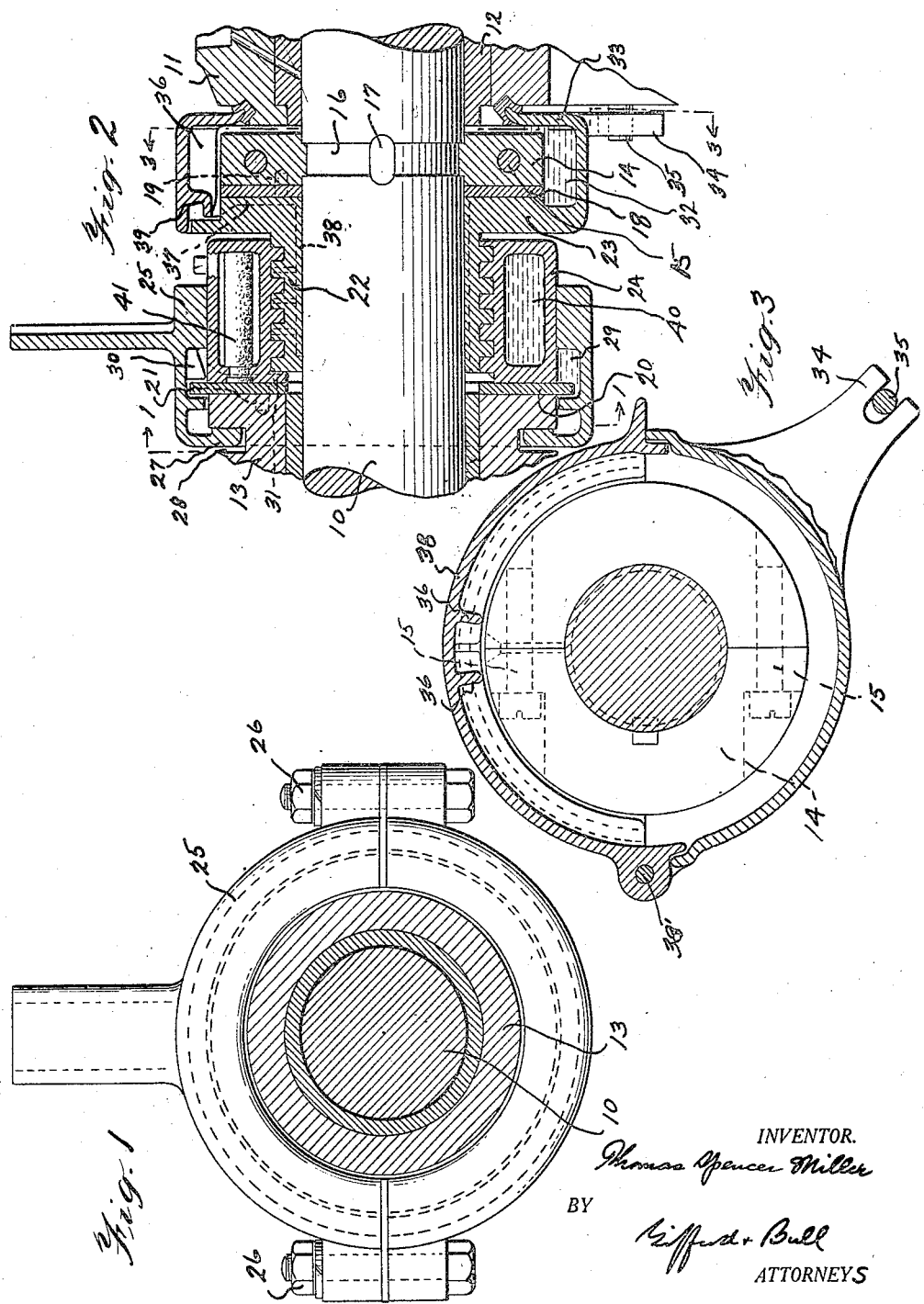

INVENTOR.
Thomas Spencer Miller
BY
Gifford & Bull
ATTORNEYS

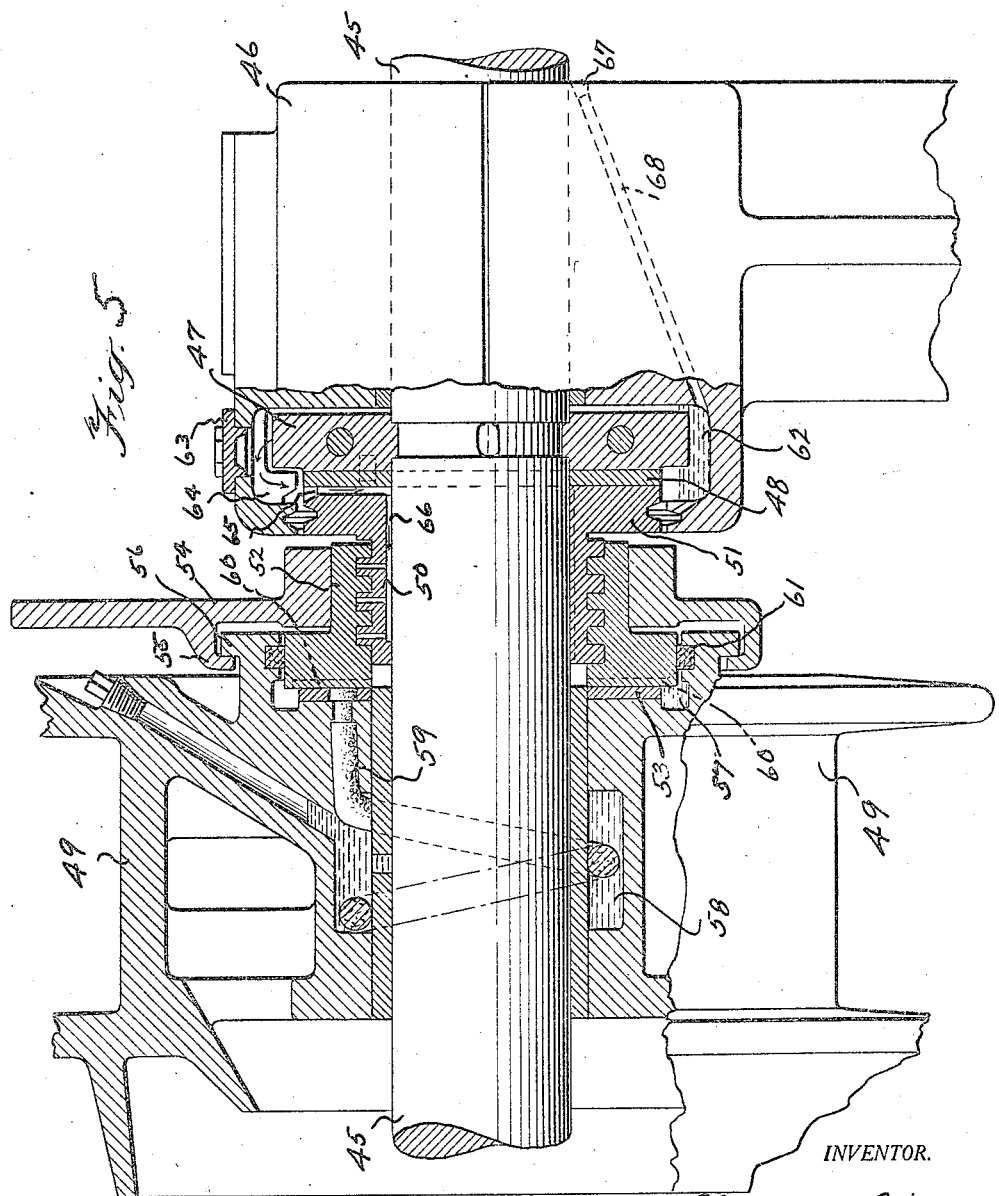

Patented Apr. 6, 1926.

1,579,381

UNITED STATES PATENT OFFICE.

THOMAS SPENCER MILLER, OF SOUTH ORANGE, NEW JERSEY.

LUBRICATING SYSTEM FOR THRUST MECHANISMS.

Application filed July 7, 1922. Serial No. 573,501.

*To all whom it may concern:*

Be it known that I, THOMAS SPENCER MILLER, a citizen of the United States, residing at South Orange, in the county of Essex and State of New Jersey, have invented certain new and useful Improvements in Lubricating Systems for Thrust Mechanisms, of which the following is a specification.

My present invention relates to lubricating systems for mechanisms for producing pressures or thrusts, such mechanisms being used in the operation of clutches or the like, as, for instance, in hoisting and derrick gear.

Figure 4:
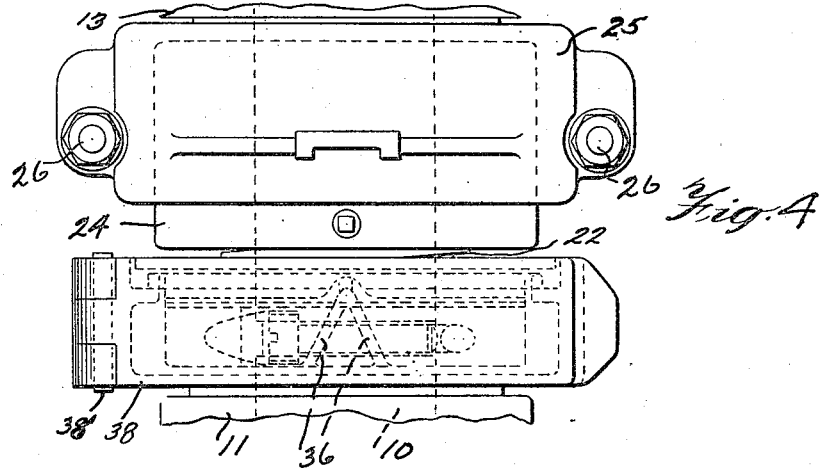
Figure 6:
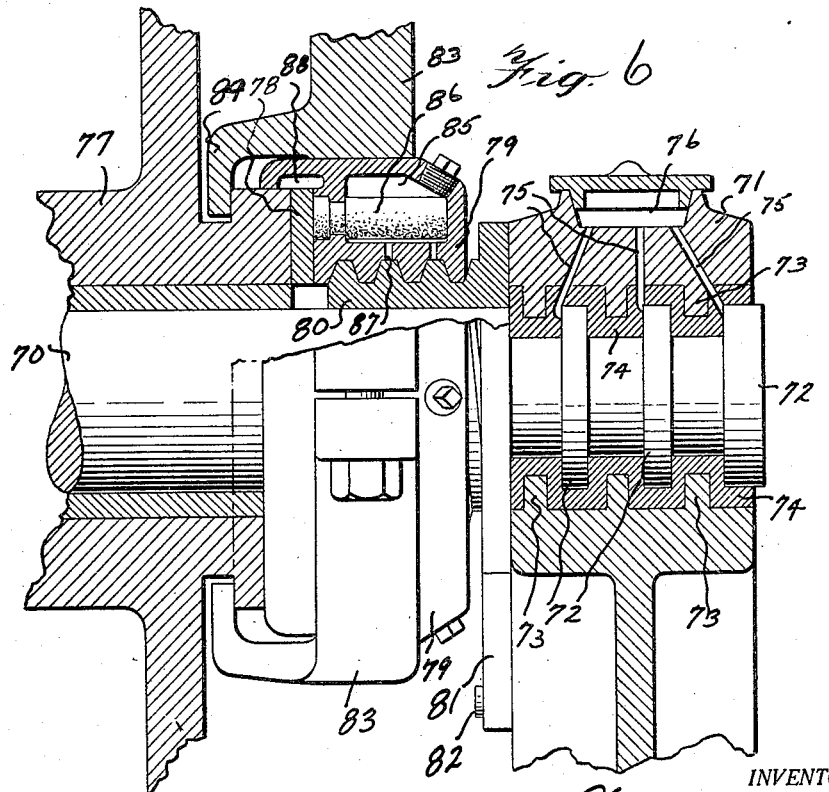

In the drawings, Fig. 1 is a section on the line 1—1 of Fig. 2; Fig. 2 is a sectional elevation of a thrust mechanism embodying my invention; Fig. 3 is a section on the line 3—3 of Fig. 2; Fig. 4 is a plan view of Fig. 2; Figs. 5 and 6 are views similar to Fig. 2 showing modifications.

Like reference characters indicate like parts in the several views.

Referring now to the arrangement shown in Figs. 1, 2, 3 and 4, a shaft 10 is rotatably mounted in suitable bearings, one of which is shown at 11 provided with a liner 12. A member 13, which may be the hub of a clutch member or similar device, is mounted on the shaft 10 and is movable longitudinally thereof for the purpose, for instance, of forcing a portion of the member into frictional engagement with another portion of a clutch mechanism. The specific form and purpose of the member 13 is no part of my present invention, but such member may be a hoisting drum or a driven member arranged to be forced into engagement with such a drum.

In the form illustrated in Fig. 2, a thrust-resisting member 14 is formed of segments held together by the screws 15, the member 14 extending into a groove 16 in the shaft 10, and also being keyed to the shaft by the key 17. Preferably, one of the faces of the thrust-resisting member 14 may be provided with a thrust ring 18 held thereon by the pins 19. The ring 18 may be of a different metal from the metal of the member 14, such as a hardened steel ring ground to a smooth surface. Similarly, the hub 13 may be provided with a thrust ring 20 held thereto by pins 21.

In the arrangement shown in Fig. 2, the thrust is produced by a nut and screw arrangement located between the thrust-resisting member and the clutch member 13. Specifically, in the form shown, this nut and screw arrangement consists of a threaded member 22 supported on but not connected to the shaft 10 and having a projection 23 carrying a thrust surface contacting with the thrust surface of the member 14, which, in the specific form illustrated, is the thrust surface of the ring 18. On the threads of the threaded member 22 is a nut 24 with a face thereof in contact with the thrust face of the member 13, which, in the specific form illustrated, is the ring 20. A handle member 25 may be clamped to the periphery of the nut 24, as by the bolts 26 so as to be held in any desired relation to the nut.

When the handle member 25 is turned, the nut 24 moves to the left in Fig. 2, since the threaded member 22 is held stationary by the pin 35. Consequently, by contact between the thrust faces of the nut 24 and of the member 13, the latter is moved to the left of Fig. 2. Similarly, when the handle is moved in the opposite direction, it is desirable to draw the member 13 toward the bearing 11, and for this purpose an extension ring 27 is connected to the handle member 25, said ring extending into a groove 28 on the clutch member 13 to press against a face thereof to move the driven member 13 to the right of Fig. 2.

It will be obvious that the various thrust surfaces, where the duty is heavy, are moving under very considerable pressures, so that it is necessary for successful operation that such surfaces shall be efficiently oiled. To this end, in the form illustrated in Fig. 2, I provide an oil chamber surrounding the periphery of each of the thrust surfaces, and preferably arrange some of the moving parts so that they will act to continually carry oil or other lubricant from the bottom of these chambers up to the top, this oil then passing down through the thrust-receiving surfaces.

Specifically in the form illustrated, the oil chamber 29 is formed in the handle member 25 which, so far as the normal operation is concerned, is substantially a part of the nut 24. In the form illustrated, the thrust ring 20 is carried beyond the periphery of the hub of the member 13 so that it projects into the lubricant at the bottom of the chamber 29 and acts to carry up the oil to the top of the chamber. At this top preferably I provide a scraper 30 which removes the oil from the ring and directs it into a downwardly extending groove 31 across the thrust surfaces. As many of these grooves may be provided as desired.

Similarly, at the opposite end of the thrust-producing means I provide an oil chamber 32 which is formed as an extension of the projection 23 of the threaded member 22, the inner wall 33 thereof being carried in toward the shaft, as shown in Fig. 2, and preferably the inner end is embedded in a felt packing or the like to make a closed chamber, this packing being held in the end of the bearing 11. An arm 34 engaging a fixed pin 35 holds the threaded member 22 and the parts connected therewith from rotation. The oil chamber 32 is formed in such a way that the thrust-resisting member 14 projects into the oil in such chamber, this oil being carried up by the rotation of the member 14 and being removed by a scraper or scrapers 36 which carry the oil to a groove or grooves 37 in the thrust surfaces. One or more of these grooves 37 may be continued into a longitudinal groove 38 along the shaft 10 so as to lubricate the internal surface of the threaded member 22.

Oil fed from the usual oil cups on the bearing 11 and passing out through the inner end of this bearing, as usual, will be received in the arrangement shown in Fig. 2 in the oil chamber 32 so as to replenish the same. Similarly, if by any chance, the bearing 11 should tend to become dry, then oil from the chamber 32 will find its way from the member 14 to the portion of the shaft in the bearing 11. In the form illustrated and as best shown in Fig. 3, I provide a movable cover 38 hinged at 38' on the extension 23 of the threaded member 22. By opening this cover, access may be had to the thrust-resisting member 14. This cover is provided with an oil shield 39 to prevent the oil passing out through the crack between the cover 38 and the extension 23.

As a further means for lubricating the thrust surfaces, I may provide the nut 24 with one or more oil pockets or chambers 40, each provided with a filling opening and each having an opening through its walls to the thrust faces of the nut, this opening preferably being filled with a wicking, such as shown at 41 to conduct the oil from the chamber 40 by capillary attraction to the thrust faces inside its periphery. Preferably, only one of such openings with its wicking will be provided for each chamber, but where a plurality of chambers are used, the openings may be suitably spaced to lubricate substantially the entire thrust surfaces.

In the arrangement shown in Fig. 5, the shaft 45 is supported in a bearing 46 and is provided with a thrust-receiving member 47 attached to the shaft 45 by a key and groove in the manner shown in Fig. 2, the member 47 having a thrust ring 48. The clutch member 49, loosely mounted on the shaft 45, is shown as a hoisting drum which is movable longitudinally of the shaft 45. The thrust-producing means, as previously described, comprises a threaded member 50 provided with an extension 51 having a thrust surface in contact with the thrust ring 48 and a nut 52 having a thrust surface in contact with a thrust ring 53 on the member 49. The nut 52 is rotated by a handle member 54 clamped adjustably thereto and provided with an extension 55 engaging a flange 56 formed on the member 49.

In this embodiment of my invention, an oil chamber 57 formed in the member 49 surrounds the periphery of the thrust surface and this thrust surface is also lubricated by oil from a chamber 58 in the member 49, this oil being carried by wicking 59 to one or more openings in the thrust ring 53 with the wicking in contact with the opposite thrust surface. Grooves 60 may be provided across the face of the nut to conduct the lubricant across the entire thrust face. The chamber 57 is sealed by a ring of packing 61 which may be felt.

At the opposite end of the thrust-producing means in the embodiment shown in Fig. 5, the oil chamber 62 is formed as a part of the bearing 46 with the cover 63 over an opening through which oil may be supplied and with scrapers 64 to remove the oil from the member 47 as it is carried up from the bottom of the chamber 62 to deliver it into grooves 65 extending across the face of the thrust surface of the threaded member 50. If desired, one or more of the grooves 65 may be continued into longitudinal grooves 66 to carry oil beneath the threaded member 50.

As is the case with the construction in Fig. 2, the lubricant from the bearing 46 will pass into the chamber 62 and this is true not only of the lubricant finding its way from the inner end of the bearing, but also of the lubricant from the outer end of the bearing, such lubricant being caught in a channel 67 and conducted through a channel 68 to the chamber 62.

Referring now to the arrangement shown in Fig. 6, the shaft 70 is carried in a bearing 71, the shaft being provided with a plurality of rings 72 integral therewith, these rings extending between rings 73 of the bearing 71 and being separated therefrom by a friction-reducing metal such as Babbitt metal formed as shown at 74. The rings 72, the rings 73 and the Babbitt metal form a thrust bearing, the surfaces being lubricated by oil ducts 75 from the oil reservoir 76.

The clutch member 77 has a hub carrying a thrust ring 78 in the manner heretofore described, this thrust ring contacting with the thrust face of a nut 79 mounted on a threaded member 80, this threaded member being held against rotation by an arm 81 engaging a fixed pin 82. A handle member 83 is clamped to the nut 79 and has an extension 84 engaging a portion of the hub 77 to move the latter to the right of Fig. 6. The nut 79 may be provided with one or more oil chambers 85 having wicking 86 to conduct the oil therein to the thrust surfaces. Oil holes 87 may lead from these oil chambers to the threads of the threaded member 80. The nut 79 is provided with an oil chamber 88 surrounding the thrust surfaces.

In the form just described, the rotation of the nut 79 moves the latter to the left of Fig. 6 and correspondingly forces the member 77 in the same direction. The reaction tends to move the threaded member 80 to the right of Fig. 6 and since this member is in contact with the face of the bearing 71, the thrust is transmitted through the babbitted surfaces to the thrust rings 72 on the shaft.

It will be understood that the arrangements which I have described are merely illustrative and that my invention may be widely varied in its embodiments.

I claim:

1. In a device of the class described, a bearing, a shaft rotatably supported therein, a clutch member on said shaft and movable longitudinally thereof, thrust-producing means between the bearing and said clutch member comprising relatively movable parts and means whereby they may be moved relatively to force the clutch member away from the bearing, a thrust-resisting member adjacent the bearing and connected to the shaft to prevent longitudinal motion of said member relative to said shaft, said thrust-producing means having a thrust surface at either end and one of said thrust surfaces contacting with a surface of said clutch member and the other of said surfaces contacting with the thrust surface of said thrust-resisting member, a lubricant chamber surrounding at least one of the thrust surfaces on the thrust-producing means, with some of the rotating parts adjacent said surface arranged to carry lubricant, by their rotation, from the chamber to said thrust surface, and means, including a lubricant reservoir and wicking from the reservoir to said thrust surface, to supply lubricant to said thrust surface inside its periphery.

2. In a device of the class described, a bearing, a shaft rotatably supported therein, a clutch member on said shaft and movable longitudinally thereof, thrust-producing means between the bearing and said clutch member comprising relatively movable parts and means whereby they may be moved relatively to force the clutch member away from the bearing, said parts being held against rotation with the shaft and the clutch member, a thrust-resisting member adjacent the bearing and connected to the shaft to prevent longitudinal motion of said member relative to said shaft, said thrust-producing means having a thrust surface at either end and one of said thrust surfaces contacting with a surface of said clutch member and the other of said surfaces contacting with the thrust surface of said thrust-resisting member, a lubricant chamber surrounding each thrust surface on said thrust-producing means with some of the rotating parts adjacent each of said surfaces arranged to carry lubricant, by their rotation, from the chamber to the thrust surface, and one of the parts of said thrust-producing means having a lubricant reservoir with an opening leading from the reservoir to the thrust surface, and wicking in said opening having a portion thereof contacting with the thrust surface inside the periphery thereof.

3. In a device of the class described, a bearing, a shaft rotatably supported therein, a clutch member on said shaft and movable longitudinally thereof, thrust-producing means between the bearing and said clutch member comprising relatively movable parts and means whereby they may be moved relatively to force the clutch member away from the bearing, said parts being held against rotation with the shaft and the clutch member, a thrust-resisting member adjacent the bearing and connected to the shaft to prevent longitudinal motion of said member relative to said shaft, said thrust-producing means having a thrust surface at either end and one of said thrust surfaces contacting with a surface of said clutch member and the other of said surfaces contacting with the thrust surface of said thrust-resisting member, a lubricant chamber surrounding each thrust surface on said thrust-producing means with some of the rotating parts adjacent each of said surfaces arranged to carry lubricant, by their rotation, from the chamber to the thrust surface, and one of the parts of said thrust-producing means having a lubricant reservoir with an opening leading from the reservoir to the thrust surface, and wicking in said opening having a portion thereof contacting with the thrust surface inside the periphery thereof, said chambers being integral with said thrust-producing means.

4. In a device of the class described, a bearing, a shaft rotatably supported therein, a clutch member on said shaft and movable longitudinally thereof, thrust-producing means between the bearing and said clutch member comprising relatively movable parts and means whereby they may be moved relatively to force the clutch member away from the bearing, said parts being held against rotation with the shaft and the clutch member, a thrust-resisting member adjacent the bearing and connected to the shaft to prevent longitudinal motion of said member relative to said shaft, said thrust-producing means having a thrust surface at either end and one of said thrust surfaces contacting with a surface of said clutch member and the other of said surfaces contacting with the thrust surface of said thrust-resisting member, a lubricant chamber surrounding each thrust surface on said thrust-producing means with some of the rotating parts adjacent each of said surfaces arranged to carry lubricant, by their rotation, from the chamber to the thrust surface, and one of the parts of said thrust-producing means having a lubricant reservoir with an opening leading from the reservoir to the thrust surface, and wicking in said opening having a portion thereof contacting with the thrust surface inside the periphery thereof, said chambers being integral with said thrust-producing means, the chamber surrounding the thrust surface adjacent the thrust-resisting member having an operable portion, whereby access may be had to the thrust-resisting member.

5. In a device of the class described, a bearing, a shaft rotatably supported therein, a clutch member on said shaft and movable longitudinally thereof, a thrust-resisting member rotating with the shaft and connected thereto to prevent longitudinal motion of said member relative to said shaft, a threaded member on the shaft and held against rotation therewith, a nut on the threaded member provided with means by which the nut may be partially rotated, the threaded member having a face contacting with a face of the thrust-resisting member and the nut having a face contacting with a face of said clutch member, said nut and threaded member being arranged to push the clutch member from the bearing when the nut is partially rotated, and means for lubricating the thrust surfaces, comprising a lubricant chamber connected to the nut and surrounding the periphery of the face of the nut contacting with the clutch member and a lubricant chamber connected to the threaded member and surrounding the periphery of the face of the threaded member contacting with the thrust-resisting member, a portion of the clutch member and a portion of the thrust-resisting member extending into their respective lubricant chambers to carry lubricant, by their rotation, to the thrust-resisting surfaces.

6. In a device of the class described, a bearing, a shaft rotatably supported therein, a clutch member on said shaft and movable longitudinally thereof, a thrust-resisting member rotating with the shaft and connected thereto to prevent longitudinal motion of said member relative to said shaft, a threaded member on the shaft and held against rotation therewith, a nut on the threaded member provided with means by which the nut may be partially rotated, the threaded member having a face contacting with a face of the thrust-resisting member and the nut having a face contacting with a face of said clutch member, said nut and threaded member being arranged to push the clutch member from the bearing when the nut is partially rotated, and means for lubricating the thrust surfaces, comprising a lubricant chamber connected to the nut and surrounding the periphery of the face of the nut contacting with the clutch member and a lubricant chamber connected to the threaded member and surrounding the periphery of the face of the threaded member contacting with the thrust-resisting member, a portion of the clutch member and a portion of the thrust-resisting member extending into their respective lubricant chambers to carry lubricant, by their rotation, to the thrust-resisting surfaces, and said nut having a lubricant chamber therein and wicking leading from said chamber to the face of the nut contacting with the clutch member and within the periphery thereof.

7. In a device of the class described, a bearing, a shaft rotatably supported therein, a clutch member on said shaft and movable longitudinally thereof, a thrust-resisting member rotating with the shaft and connected thereto to prevent longitudinal motion of said member relative to said shaft, a threaded member on the shaft and held against rotation therewith, a nut on the threaded member provided with means by which the nut may be partially rotated, the threaded member having a face contacting with a face of the thrust-resisting member and the nut having a face contacting with a face of said clutch member, said nut and threaded member being arranged to push the clutch member from the bearing when the nut is partially rotated, and means for lubricating the thrust surfaces, comprising a lubricant chamber connected to the nut and surrounding the periphery of the face of the nut contacting with the clutch member and a lubricant chamber connected to the threaded member and surrounding the periphery of the face of the threaded member contacting with the thrust-resisting member, a portion of the clutch member and a portion of the thrust-resisting member extending into their respective lubricant chambers to carry lubricant, by their rotation, to the thrust-resisting surfaces, the chamber surrounding the periphery of the face of the threaded member being adapted to receive lubricant escaping from the adjacent shaft bearing.

8. In a device of the class described, a bearing, a shaft rotatably supported therein, a clutch member on said shaft and movable longitudinally thereof, a thrust-resisting member rotating with the shaft and connected thereto to prevent longitudinal motion of said member relative to said shaft, a threaded member on the shaft and held against rotation therewith, a nut on the threaded member provided with means by which the nut may be partially rotated, the threaded member having a face contacting with a face of the thrust-resisting member and the nut having a face contacting with a face of said clutch member, said nut and threaded member being arranged to push the clutch member from the bearing when the nut is partially rotated, and means for lubricating the thrust surfaces, comprising a lubricant chamber connected to the nut and surrounding the periphery of the face of the nut contacting with the clutch member and a lubricant chamber connected to the threaded member and surrounding the periphery of the face of the threaded member contacting with the thrust-resisting member, a portion of the clutch member and a portion of the thrust-resisting member extending into their respective lubricant chambers to carry lubricant, by their rotation, to the thrust-resisting surfaces, the chamber surrounding the periphery of the face of the threaded member extending over the thrust-receiving member and having an operable cover, whereby access may be had to the thrust-receiving member.

9. In a device of the class described, a bearing, a horizontal shaft rotatably supported therein, a clutch member on said shaft and movable longitudinally thereof, a thrust-resisting member rotating with the shaft and connected thereto to prevent longitudinal motion of said member relative to said shaft, a threaded member on the shaft and held against rotation therewith, a nut on the threaded member provided with means by which the nut may be partially rotated, the threaded member having a face contacting with a face of the thrust-resisting member and the nut having a face contacting with a face of said clutch member, said nut and threaded member being arranged to push the clutch member from the bearing when the nut is partially rotated, and means for lubricating the thrust surfaces, comprising a lubricant chamber connected to the nut and surrounding the periphery of the face of the nut contacting with the clutch member and a lubricant chamber connected to the threaded member and surrounding the periphery of the face of the threaded member contacting with the thrust-resisting member, a portion of the clutch member and a portion of the thrust-resisting member extending into their respective lubricant chambers, and said chambers being provided at the top with scrapers arranged to remove the lubricant carried up by said parts and to lead it to the upper part of said contacting faces to lubricate the same.

THOMAS SPENCER MILLER.